(No Model.) 3 Sheets—Sheet 1.

F. E. RICHARDSON.
CASH REGISTER AND RECORDER.

No. 464,257. Patented Dec. 1, 1891.

WITNESSES:

INVENTOR:
Frank E. Richardson
By Hull, Laass & Hull
his ATTORNEYS.

(No Model.) 3 Sheets—Sheet 2.

F. E. RICHARDSON.
CASH REGISTER AND RECORDER.

No. 464,257. Patented Dec. 1, 1891.

WITNESSES:
C. L. Bendixon
H. M. Seamans

INVENTOR:
Frank E. Richardson
By Hull, Laass & Hull
his ATTORNEYS.

(No Model.) 3 Sheets—Sheet 3.

F. E. RICHARDSON.
CASH REGISTER AND RECORDER.

No. 464,257. Patented Dec. 1, 1891.

WITNESSES:

INVENTOR:
Frank E. Richardson
By Duell, Laass & Duell
his ATTORNEYS.

UNITED STATES PATENT OFFICE.

FRANK E. RICHARDSON, OF CAZENOVIA, NEW YORK.

CASH REGISTER AND RECORDER.

SPECIFICATION forming part of Letters Patent No. 464,257, dated December 1, 1891.

Application filed February 4, 1891. Serial No. 380,137. (No model.)

*To all whom it may concern:*

Be it known that I, FRANK E. RICHARDSON, of Cazenovia, in the county of Madison, in the State of New York, have invented new and useful Improvements in Cash Registers and Recorders, of which the following, taken in connection with the accompanying drawings, is a full, clear, and exact description.

This invention relates to a cash register and recorder which is specially designed for use in stores and other business places where frequent cash payments are made during business hours.

The purpose of the invention is chiefly to provide simple, convenient, and reliable means to enable the proprietor or manager of the aforesaid place of business to keep an accurate account of cash received and paid out in the transaction of business during each day; and to that end the invention consists in the novel construction of the cash register and recorder hereinafter described, and specifically set forth in the claims.

Figure 1:
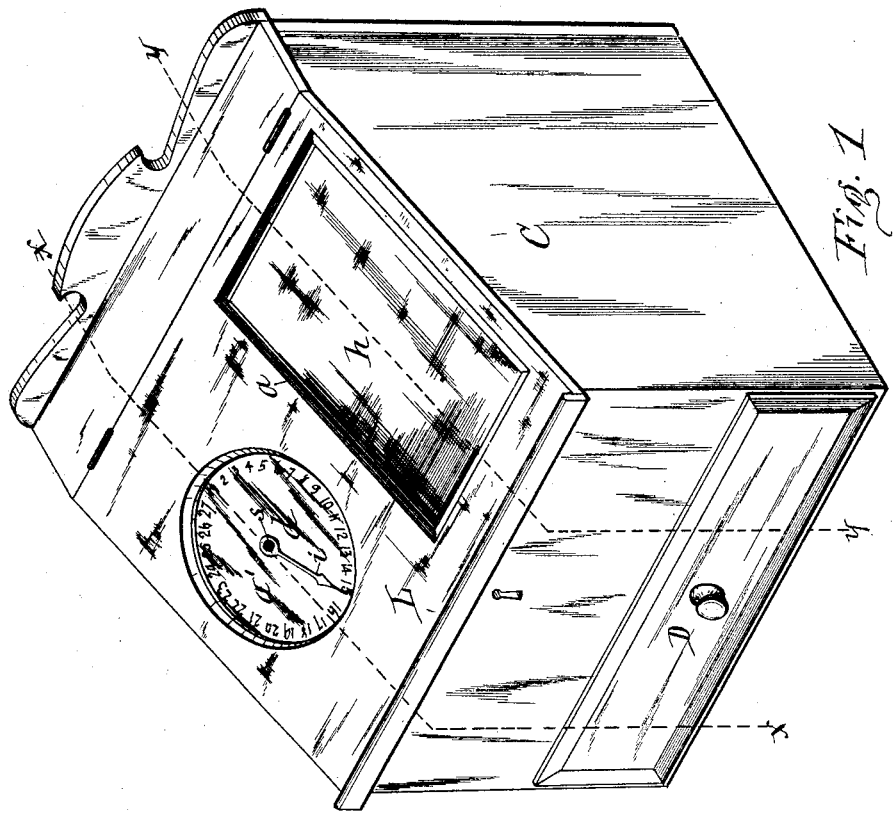
Figure 2:
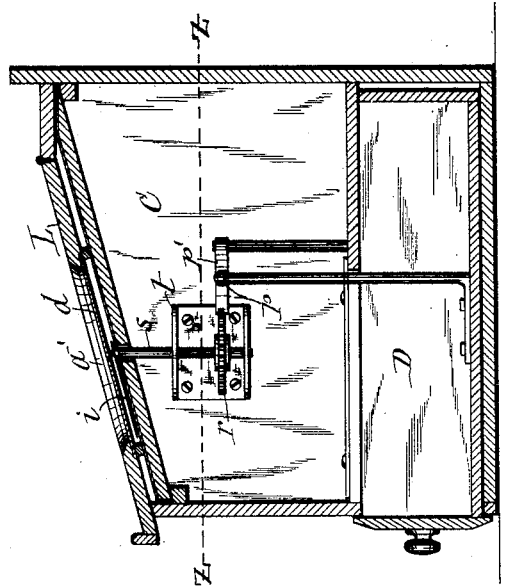
Figure 3:
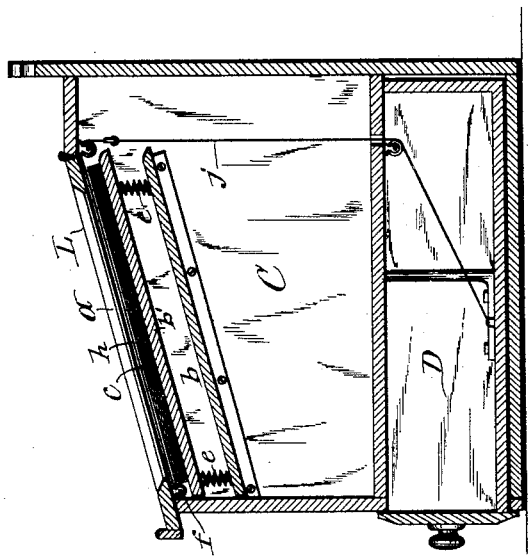
Figure 4:
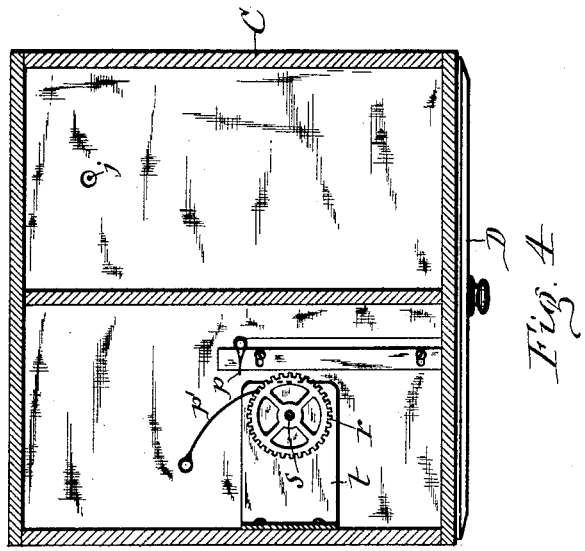
Figure 5:
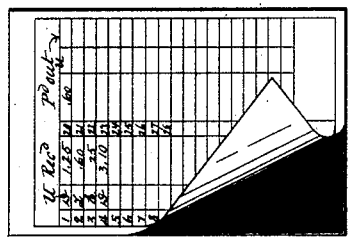

In the annexed drawings, Figure 1 is a perspective view of a cash register and recorder embodying my invention. Figs. 2 and 3 are vertical transverse sections, respectively, on lines $x\ x$ and $y\ y$, Fig. 1. Fig. 4 is a horizontal transverse section on line $z\ z$, Fig. 2; and Fig. 5 is a plan view of the account-tablet.

Similar letters of reference indicate corresponding parts.

C represents a case, which is preferably of the form of a small desk, having a hinged lid L and provided in its lower portion with a drawer D or other suitable receptacle for the money to be registered and recorded. In a suitable part of the case, preferably in the lid L, is a transparent portion $a'$, formed by an aperture in which a glass plate is set. Central under this transparent portion is a spindle $s$, pivoted to a bracket $t$, secured to the interior of the case. To this spindle is rigidly attached a ratchet-wheel $r$, and to the drawer D is affixed a spring-pawl $p$, which is in such a position as to cause it to engage the ratchet-wheel $r$ and turn the same a distance equal to that between two of its teeth in the operation of pulling the drawer out of the case sufficiently to obtain access to the interior of the drawer. In pushing the drawer back into the case the spring-pawl $p$ yields to the contact with the ratchet-wheel, which latter is prevented from turning back by means of a dog $p'$, secured to the case and engaging the ratchet-wheel.

Directly under the transparent portion $a'$ is a dial $d$, through the center of which protrudes the upper end of the spindle $s$, and to the latter is attached a hand or indicator $i$. The said dial is provided with numbers arranged in consecutive order in a circle concentric with the spindle $s$. Each impulse imparted to the spindle by the operation of opening the drawer, as hereinbefore described, causes the indicator to move from one number of the dial to the next number, and thus a register is obtained for determining the number of times the drawer has been opened.

In order to keep an account of the money deposited or removed from the drawer D, a tablet $c$ is provided, which tablet has each of its pages ruled and printed with numbers in regular consecutive order. The persons who have access to the drawer D are each required to record in the tablet the amount of money he or she has deposited in or withdrawn from the drawer at the time of said transaction, and such record must be made opposite the number corresponding to the number indicated on the dial by the indicator $i$. A blank column $u$ is also provided opposite the row of numbers in the tablet, in which column the person making the entry is required to mark his or her initial or other mark of identification of the person. Said mark is to be made opposite the same number at which the amount of money has been recorded. In this manner an account of the money to be in the drawer is kept and readily ascertained, and also a record is obtained of the persons who have had access to the money-drawer, and thus errors or false entries can be traced to the person who has committed the same. I prefer to employ in connection with the account-tablet $c$ a carbon-sheet or black transferring-paper to be placed between the leaf receiving the entries and underlying leaf, so as to obtain on the latter leaf an exact copy of the entries made on the top leaf, said two leaves being torn from the tablet at the end of each day or whenever deemed necessary. One leaf may be taken by the accountant to make the entries in the regular set of books and the other leaf may be filed for future reference.

The tablet $c$ I secure to a suitable holder in the interior of the case C immediately under the lid L, which I provide with an open port $a$ to obtain access to the top leaf of the tablet for making the aforesaid entries. In order to keep the tablet close to the under side of the lid after the same has been reduced in thickness by the separation of a number of leaves from the top thereof, as hereinbefore described, I form the tablet-holder with a pocket $b$ under the port $a$, in which pocket are placed suitable springs $e\ e$, upon which lies a plate $b'$, which carries the tablet $c$. The port $a$, being smaller than the tablet, causes the latter to be held in place by the lid bearing on the marginal portions of the tablet.

Inasmuch as it is desirable to conceal the tablet $c$ when not in use, I provide the same with a suitable removable cover $h$, and in order to automatically move this cover I form the same of a curtain, which is connected at one end to the drawer D by a cord or tape $j$ and at the opposite end to a spring-roller $f$, similar to those in common use on window-shades and connected to the case or under side of the lid L. The connection of the curtain to said spring-roller is made by means of suitable tapes or cords wound on said roller and of sufficient length to allow the latter end of the curtain to be drawn to the upper end of the tablet. In opening the drawer D the cord or tape $j$ draws the curtain $h$ up to the upper end of the tablet and exposes the same, and in closing the drawer the spring-roller draws the curtain down over the tablet so as to conceal it.

Having described my invention, what I claim as new, and desire to secure by Letters Patent, is—

1. A cash registering and recording apparatus comprising a money-receptacle, a case inclosing said receptacle, a number-register connected to the money-receptacle to be actuated by the movement of the same to its open position, and a normally-inaccessible record-tablet connected to the aforesaid case and rendered accessible by the movement of the money-receptacle, as set forth.

2. The improved cash-register comprising the case C, provided with the drawer D, a number-register connected to the case and to the drawer to be actuated by the latter, a record-tablet secured to the case, and a removable cover normally over the tablet and connected to the drawer and removed from the tablet by the movement of the drawer to its open position, as set forth.

3. The combination of the case C, provided with the drawer D, a tablet-holder in said case, and a removable cover secured over said holder and connected to the drawer to be operated thereby, as set forth.

4. The combination of the case C, provided with the drawer D, open port $a$, and pocket $b$ under said port, the tablet $c$ in said pocket, the spring-roller $f$, connected to the case at one end of the port $a$, and the curtain $h$, connected at one end to the spring-roller and at the opposite end to the aforesaid drawer, substantially as and for the purpose set forth.

In testimony whereof I have hereunto signed my name this 22d day of January, 1891.

FRANK E. RICHARDSON. [L. S.]

Witnesses:
 J. W. HALL,
 H. U. CLARK.